United States Patent
Freudelsperger

(10) Patent No.: US 7,882,933 B2
(45) Date of Patent: *Feb. 8, 2011

(54) PROCESS AND CENTRAL BELT AUTOMATIC UNIT FOR FILLING AN ORDER CONTAINER IN A COMMISSIONING SYSTEM

(75) Inventor: Karl Freudelsperger, Hart bei Graz (AT)

(73) Assignee: Knabb Logistik Automation GmbH, Hart bei Graz (AT)

( * ) Notice: Subject to any disclaimer, the term of this patent is extended or adjusted under 35 U.S.C. 154(b) by 144 days.

This patent is subject to a terminal disclaimer.

(21) Appl. No.: 12/278,466

(22) PCT Filed: Feb. 13, 2007

(86) PCT No.: PCT/EP2007/001237

§ 371 (c)(1),
(2), (4) Date: Aug. 6, 2008

(87) PCT Pub. No.: WO2007/093383

PCT Pub. Date: Aug. 23, 2007

(65) Prior Publication Data

US 2009/0026017 A1     Jan. 29, 2009

(30) Foreign Application Priority Data

Feb. 17, 2006   (DE) ..................... 10 2006 007 364

(51) Int. Cl.
*E04H 3/00* (2006.01)

(52) U.S. Cl. ................. 186/69; 198/523; 198/532; 198/550.01; 186/35; 186/36; 186/52; 186/2; 700/216; 700/228; 700/230

(58) Field of Classification Search ............ 198/550.01, 198/523, 532; 700/216, 218–230; 186/2, 186/22–24, 49–51, 57, 58, 69, 35–38, 41, 186/52, 53

See application file for complete search history.

(56) References Cited

U.S. PATENT DOCUMENTS 5,271,703 A * 12/1993 Lindqvist et al. ............ 414/268
5,478,183 A    12/1995 Savigny (Continued)

FOREIGN PATENT DOCUMENTS

DE         89 07 478 U1    8/1989

(Continued)

OTHER PUBLICATIONS

Translation of SU 548488 A.*

*Primary Examiner*—Jeffrey A Shapiro
(74) *Attorney, Agent, or Firm*—McGlew and Tuttle, P.C.

(57) ABSTRACT

A method and a central-belt machine are provided for filling an order container. The central-belt machine includes two central belt provided with articles along a virtual window of an order, and the articles being discharged to the order container at a filling point at the front longitudinal end (V) of the central belt. The two central belts (1, 2) of the central-belt machine, are arranged vertically one above the other, to fill the order container (3), for an order, by at least one interposed vertical conveyor (4) at a single filling point (P) of the lower central belt (2).

21 Claims, 7 Drawing Sheets

U.S. PATENT DOCUMENTS 6,208,908 B1 * 3/2001 Boyd et al. .................. 700/216
6,443,102 B1 * 9/2002 Schepers et al. ............ 119/843
7,748,519 B2 * 7/2010 Freudelsperger ....... 198/550.01

FOREIGN PATENT DOCUMENTS

DE     202006002506 U1    5/2006
SU           548488 A  *  3/1977
WO     WO 2006/084750    8/2006

* cited by examiner

US 7,882,933 B2

PROCESS AND CENTRAL BELT AUTOMATIC UNIT FOR FILLING AN ORDER CONTAINER IN A COMMISSIONING SYSTEM

CROSS REFERENCE TO RELATED APPLICATIONS

This application is a United States National Phase application of International Application PCT/EP2007/00123 and claims the benefit of priority under 35 U.S.C. §119 of German Patent Application DE 10 2006 007 364.9 filed Feb. 17, 2006, the entire contents of which are incorporated herein by reference.

FIELD OF THE INVENTION

The present invention pertains to a process and a central belt automatic unit for filling an order container with a central belt, which is provided with commissioning goods along a virtual window of a commissioning order, wherein the commissioning goods are released to the order container at a filling point at the front longitudinal end of the central belt.

The front longitudinal end of the central belt is the longitudinal end of the central belt that ejects the commissioning goods conveyed on the running belt into the positioned order container in the direction of running or conveying of the central belt. The rear longitudinal end of the central belt is correspondingly defined as the other longitudinal end of the central belt.

BACKGROUND OF THE INVENTION

Central belt automatic units of the above-mentioned type, in which a virtual window is allocated or set up at the conveying or central belt, are known in a commissioning system according to the state of the art. The products, which are arranged along the central belt in commissioning bays, are ejected into this window by various types of ejectors. The products thrown into the window are transferred at a filling point onto an order container. The length of a central belt determines the number of products, which are preferably arranged on both sides of the central belt in vertical shafts of the commissioning bay. This is true regardless of the type of the ejector. Central belt automatic units with central belts of up to approx. 100 m are currently being built. The building dimensions or the technical limits often fail to permit extension of the central belt.

However, if more products are to be commissioned automatically than have place on a central belt, another central belt automatic unit must be built, which extends in parallel to and at a spaced location from the first central belt automatic unit, preferably at the same level. The order containers then pass by the filling points of the two automatic units. The connection between the automatic units is embodied by setting up any desired conveying technique, preferably by a driven cross belt.

The drawback of this variant is that because of the two filling points, a complicated, energy-consuming cross conveying technique and at least two control systems are needed. If the central belts of the two central belt automatic units are not at the same level, the necessary ascending belts of the cross conveying technique require a lot of space. The commissioning paths are long. The commissioning time is correspondingly long as well.

SUMMARY OF THE INVENTION

The object of the present invention is to provide a process for filling an order container in a central belt automatic unit of the type mentioned in the introduction, which has a simple and compact design, is fast and can be operated effectively in a commissioning system and can be adapted to different local conditions with simple means. The present invention also pertains, furthermore, to the provision of an above-mentioned central belt automatic unit.

The essence of the present invention in a process mentioned in the introduction for filling an order container in a central belt automatic unit with a central belt is to fill at least two central belts of the central belt automatic unit, which said central belts are arranged vertically one on top of another, by means of at least one vertical conveyor arranged between them at a single filling point of the lower central belt for a commissioning order.

The upper and lower central belts can fill the order container at the single filling point simultaneously or in an immediate sequence with commissioning goods for an especially rapid filling operation.

Commissioning goods are ejected especially from the front longitudinal end of the upper central belt into the upper inlet of the vertical conveyor, conveyed downward in the vertical conveyor, and ejected at the lower outlet of the vertical conveyor onto the lower central belt or into a positioned order container.

The downward conveying of the commissioning goods by the vertical conveyor is advantageously carried out such that the force of gravity of the commissioning goods is utilized by the cycled opening and closing of stationary trays.

Large-sized and/or heavy and/or frequently commissioned commissioning goods may be preferably commissioned on the lower central belt, and small-sized and/or lightweight and/or rarely commissioned commissioning goods can be commissioned on the upper central belt.

A central belt automatic unit operated according to the process described above consequently provides, in particular, for two central belts arranged vertically one on top of another with direct interposition of at least one stationary, especially compact vertical conveyor, which conveys only vertically downwardly and which needs no energy for conveying due to the utilization of the force of gravity of the commissioning goods being conveyed, the overall arrangement being such that there is only one filling point, at which an order container is positioned for a complete commissioning order for many different products or commissioning goods.

At least one additional upper central belt, which is connected at its front longitudinal end via another vertical conveyor of the aforementioned type to the vertically directed vertical conveyor or the upper central belt, may also be provided for a greater number of different commissioning goods.

Every individual central belt may also be provided alone for smaller commissioning orders.

The trays of the vertical conveyor are advantageously basic modules, where the number of basic modules is determined by the vertical conveying height or the difference in height to be bridged over between the central belts.

The basic modules may be optionally put together vertically for simple assembly.

Thus, the present invention creates a combination of two or more central belts one on top of another by means of vertical transfer site(s), wherein the central belts are combined such that only one filling point is needed and the combination can thus be controlled by a single control system. The central belts mounted one on top of another have a vertical transfer site in the form of a special vertical conveyor, which is arranged basically at the front end of the upper central belt and can open at any point of the lower central belt. The transfer site typically opens at the front or rear end of the lower central belt. The only filling point also belongs to the front end of the lower central belt. The vertical transfer site may also open directly into the filling point.

The central belts always operate at the same velocity due to a synchronization control. The vertical transfer is operated such that each order has a constant transit time, as a result of which a fixed displacement of the central belt window is obtained at the top and at the bottom. Changes in velocity of the central belts also affect the velocity of the vertical transfer.

The advantage of the present invention is that little space and especially a small floor space is needed for installation because of the vertical arrangement of the central belts one on top of another, and a great overall length of central belts can be set up for commissioning many different products. The special vertical conveyor is integrated in the overall arrangement such that it does not require any appreciable additional space for installation, because the higher-level control is a single central belt automatic unit. The vertical distance between the central belts is not limited, because the mechanics of vertical transfer by the basic modules can be scaled or expanded as desired.

Due to the relatively short "conveying time" of the vertical transfer, the displacement of the central belt windows is smaller than with comparable conveying technical solutions. As a result, a smaller buffer section is needed between the reading of the log-on and the filling point.

The present invention will be described in more detail below on the basis of exemplary embodiments with reference to the attached drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
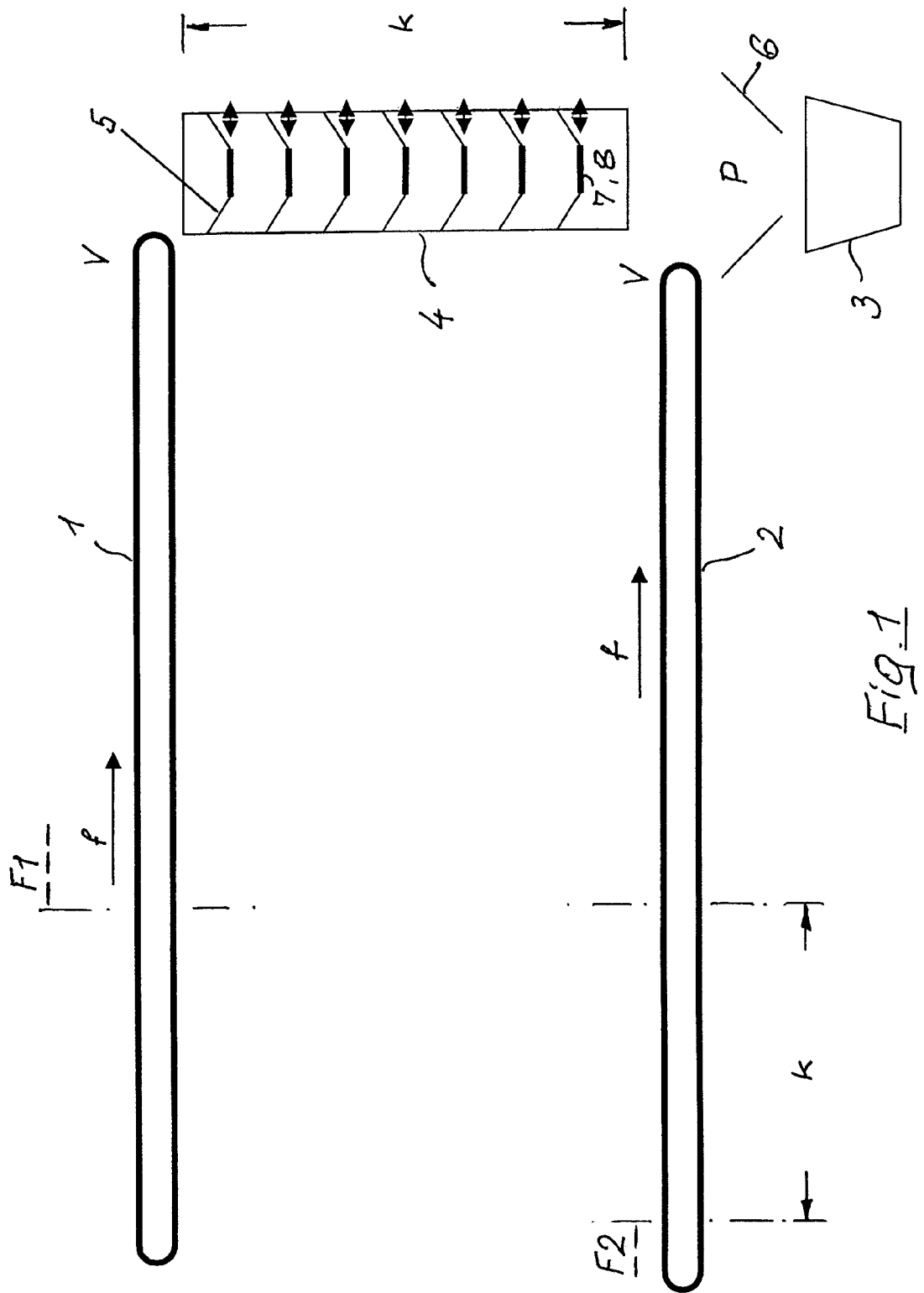
FIG. 1 is a schematic view showing a central belt automatic unit according to the present invention with two central belts arranged one on top of another and with a vertical conveyor arranged between them, wherein the upper central belt is directly connected via the vertical conveyor to the filling point or the order container.

Referring to the drawings in particular, according to the drawings, a central belt automatic unit for filling an order container 3 comprises two circulating central belts 1, 2, which are arranged horizontally in parallel to one another at vertically spaced locations, exactly one on top of another in a commissioning system, which is of no particular interest here. The central belts 1, 2 may be of equal or different length.

The two central belts 1, 2 have a single filling point P at the front longitudinal end V of the lower central belt 2 for filling an order container 3 positioned there with commissioned commissioning goods from commissioning bays (not shown), which extend along the central belts 1, 2 on the side and eject commissioned commissioning goods by means of transverse ejectors onto the upper and lower central belts 1, 2 in selected areas or so-called allocated virtual windows F1, F2 of a certain commissioning order.

Figure 2:
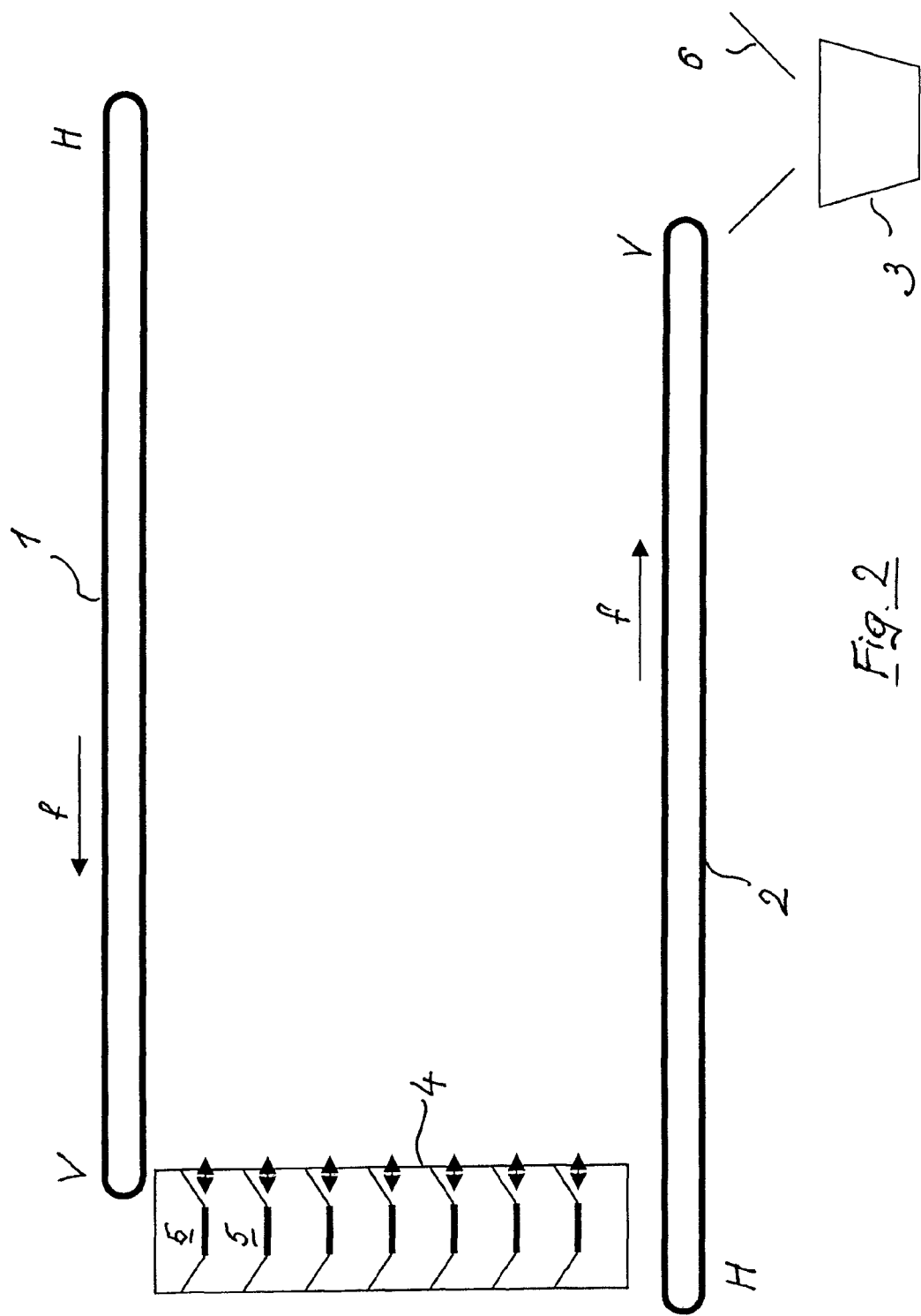
FIG. 2 is a second central belt automatic unit similar to that in FIG. 1, in which the upper central belt is connected via the vertical conveyor to the rear longitudinal end of the lower central belt.
Figure 3:
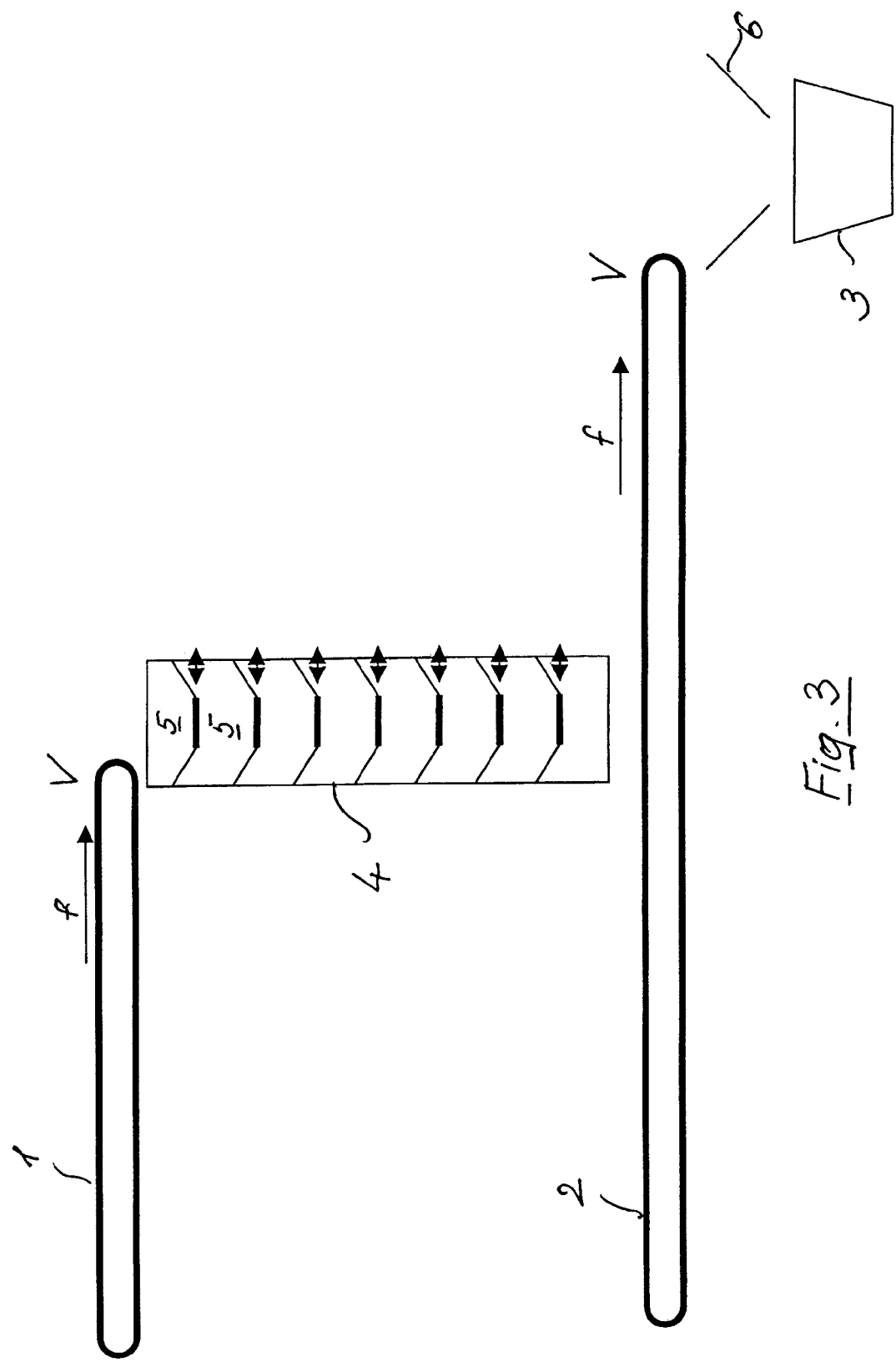
FIG. 3 is a third central belt automatic unit similar to that in FIG. 2, in which the upper central belt is connected via the vertical conveyor to the middle area of the lower central belt.

The inlet of a stationary vertical conveyor 4 with stationary trays 5 of the modular design, which can be opened downwardly, is located at the front longitudinal end V of the upper central belt 1, the inlet feeding commissioning goods of the upper central belt 1 downwardly directly to the filling point P in a first embodiment variant of the present invention according to FIG. 1 by cycled opening and closing of the trays 5 or it transfers, especially ejects, such commissioning goods to the lower central belt 2 in another embodiment variant according to FIGS. 2 and 3 either at the rear longitudinal end H or in a middle area M of the lower central belt 2, from which the commissioning goods of the upper central belt 1 are conveyed together with the commissioning goods of the lower central belt 2 in the direction of the common filling point P to the order container 3 and ejected at the front longitudinal end of the lower central belt 2 into the order container 3.

The downward conveying of the commissioning goods by the vertical conveyor 4 takes place with the utilization of the force of gravity of the commissioning goods by cyclically alternating opening and closing of consecutive trays 5, wherein the commissioning goods preferably always fall into the next lower tray. Individual trays may also remain continuously open here in order to set up a greater height of falling of the commissioning goods and hence more rapid cycling if this is tolerated by the commissioning goods and is desirable in the particular individual case.

Figure 4:
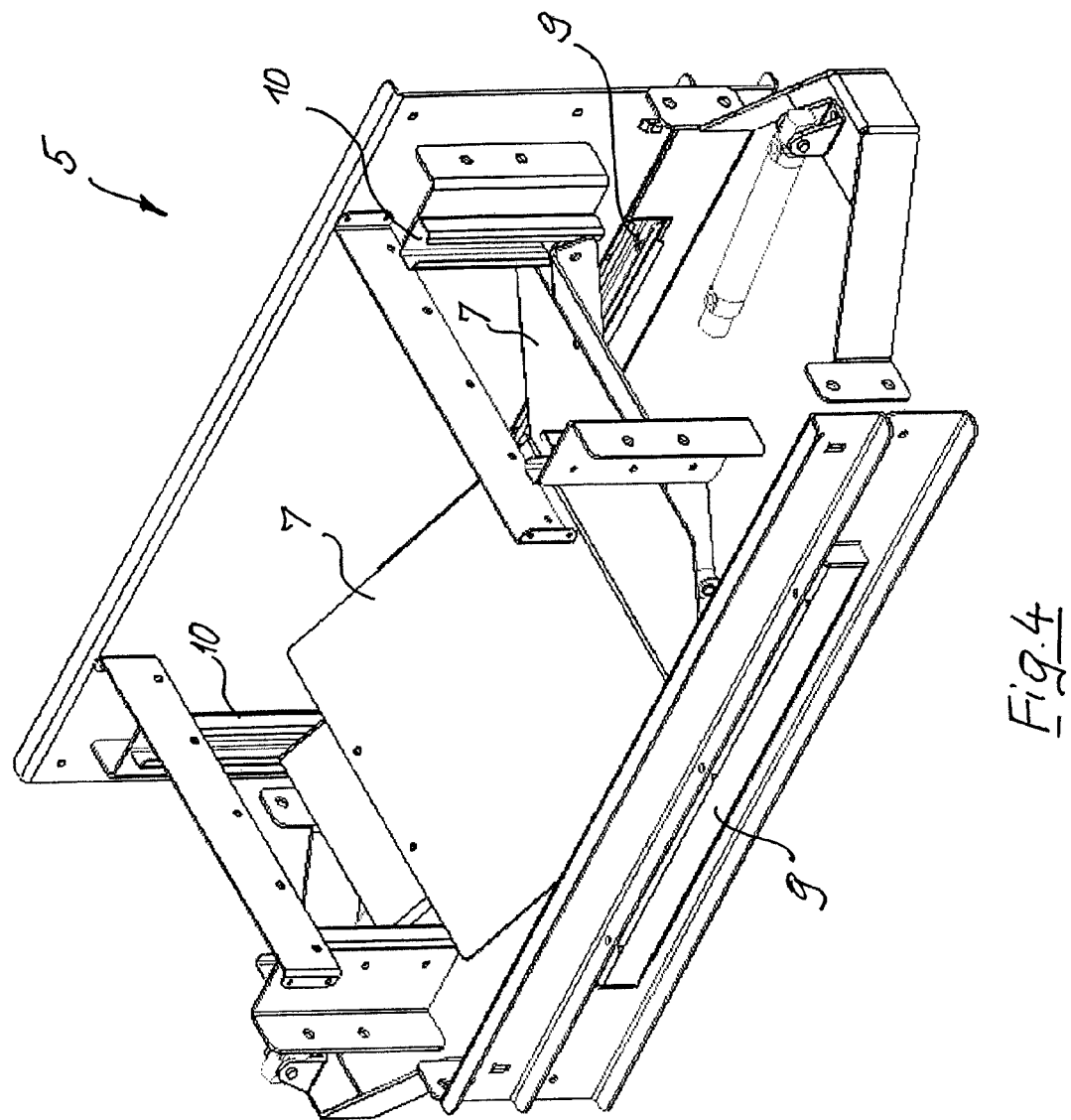
FIG. 4 is in cut-away perspective view showing details of a tray in a closed position, which can be opened downwardly.
Figure 5:
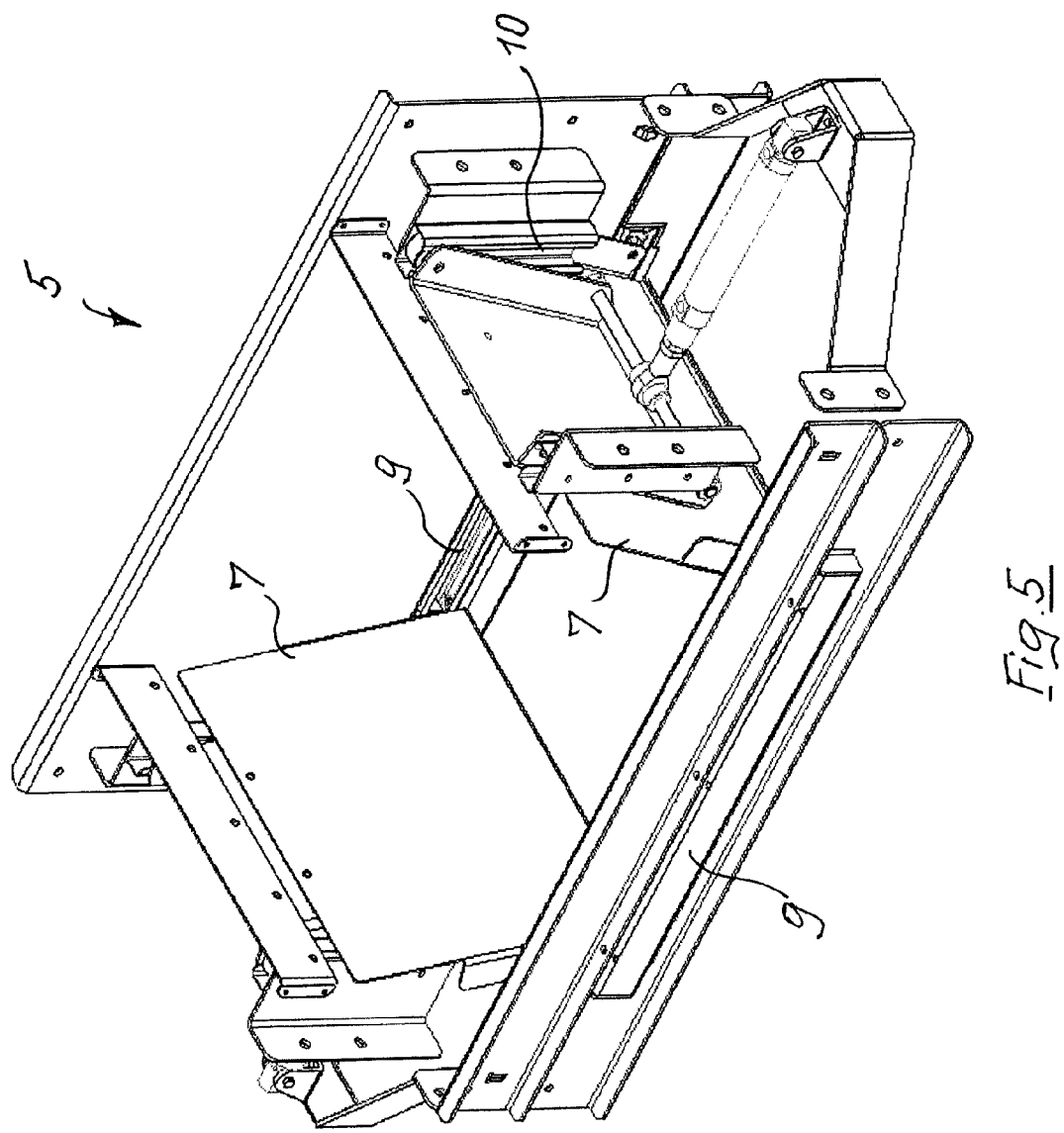
FIG. 5 is in cut-away perspective view showing details of the tray in the open position, which tray can be opened downwardly.
Figure 6:
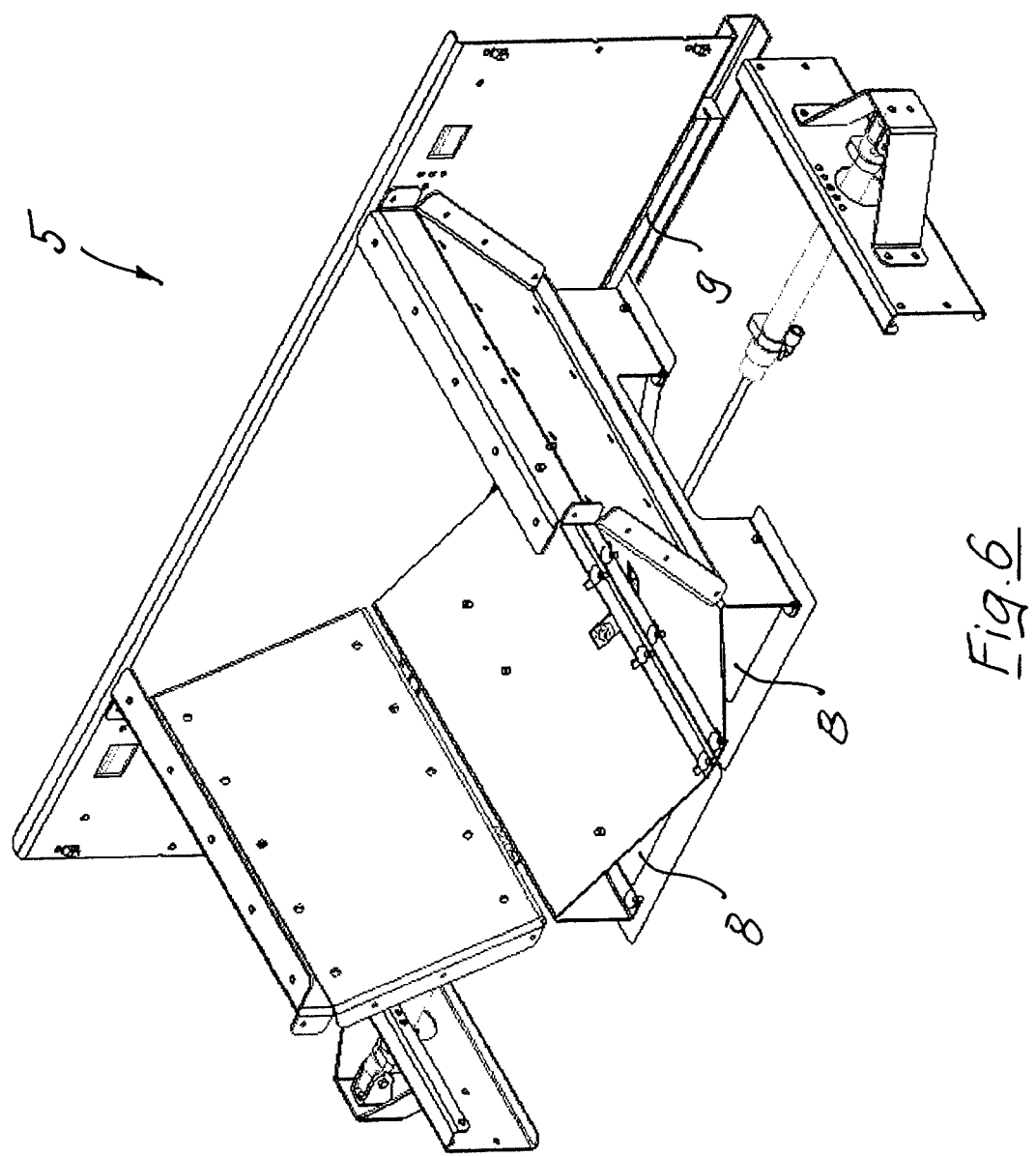
FIG. 6 is in cut-away perspective view showing a tray of another design, similar to the closed position view according to FIG. 4.
Figure 7:
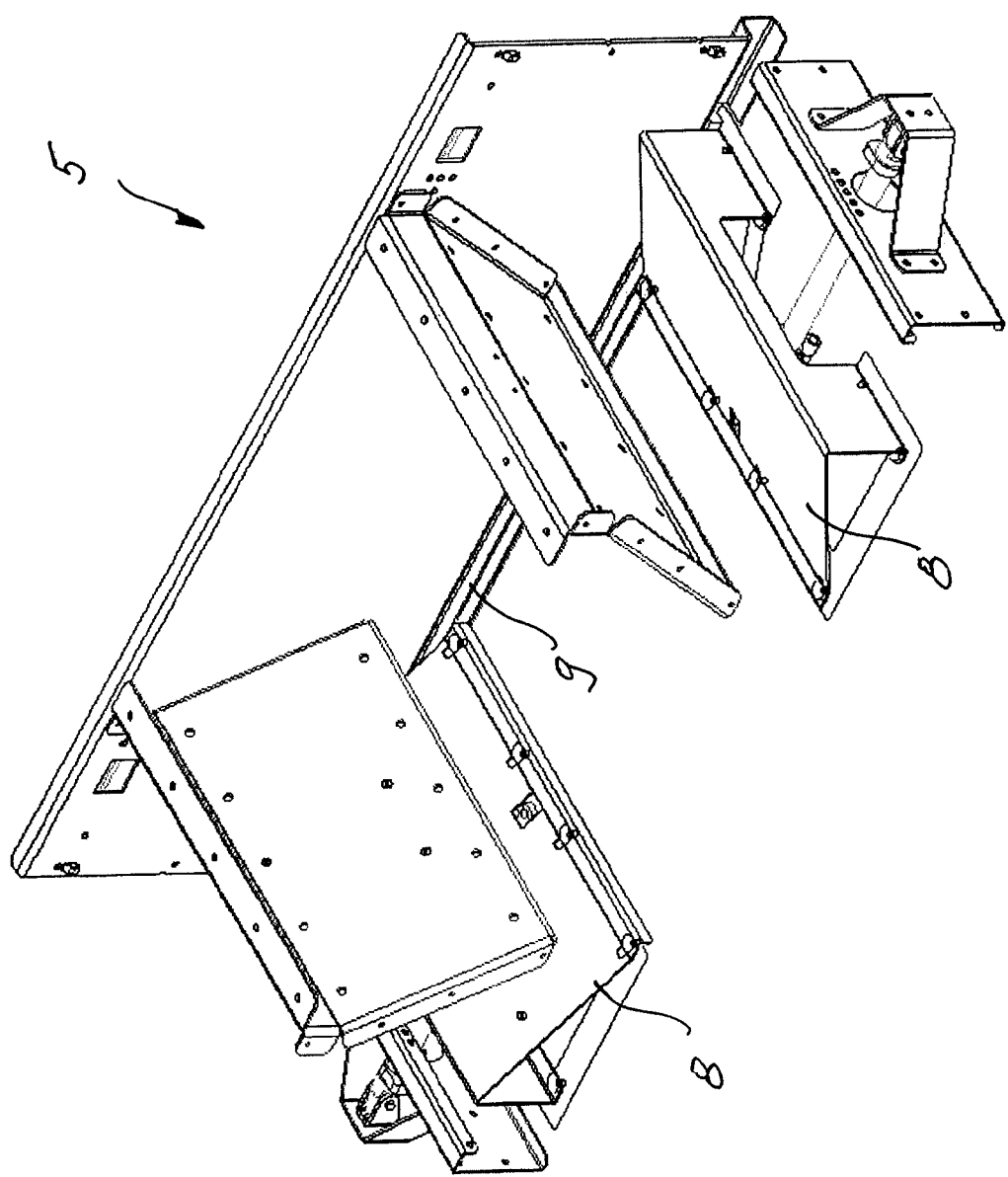
FIG. 7 is in cut-away perspective view showing a tray of another design, similar to the open position view according to FIG. 5.

The trays 5, which can be opened downwardly, have two adjustable flap walls 7, which face each other and can be opened on the bottom side, in one embodiment variant according to FIGS. 4 and 5, or two wedge-shaped horizontal slides 8 as an opening mouth, which face each other and can be opened on the bottom side, in another embodiment variant according to FIGS. 6 and 7, wherein the two adjustable flap walls 7 or the two horizontal slides 8 are guided laterally in horizontal guide rails 9 in the area of the bottom-side opening mouth. The two adjustable flap walls 7 according to FIGS. 4 and 5 additionally have vertical guide rails 10 at the other end, which end faces away from the end of the adjustable flap walls, which said latter end is guided in the horizontal guide rails 9.

Large-sized and/or heavy and/or frequently commissioned commissioning goods are preferably commissioned on the lower central belt 2 and small-sized and/or lightweight and/or rarely commissioned commissioning goods are commissioned on the upper central belt 1.

Corresponding to the transit time k of the commissioning goods through the vertical conveyor 4, virtual windows F1, F2 of a commissioning order, which are offset in time, are assigned or allocated to the upper and lower central belts 1, 2.

The central computer of the central belt automatic unit has a control means, which not only initiates the loading/commissioning of the commissioning goods onto the central belts 1, 2 after reading the log-on of the commissioning order, but also controls the central belts 1, 2 and the vertical conveyor 4 as well as the readying and the removal of the order containers 3.

The control means is set such that a constant conveying velocity f of the central belts 1, 2 is preferably set up during the operation.

The control means also ensures a constant velocity of passage k of the vertical conveyor 4 in a preferred operation, which velocity preferably corresponds to the time offset of the two windows F1, F2 in FIG. 1.

The control means is set, in particular, such that synchronous transfer of the commissioning goods or transfer of commissioning goods that is directly consecutive in time from the central belts 1, 2 to the order container 3 is set up at the site of the only filling point P. A rapid filling operation of the order container is thus set up even in case of many different products or commissioning goods, which have been commissioned primarily into the upper or lower central belt and reach the order container 3 from there.

The control means may optionally also be set up such that buffering or intermediate storage is set up in the vertical conveyor 4 if this is required in the individual case or because of a disturbance of the system.

A filling hopper 6 may be arranged in front of the only filling point P of the order container 3 for more reliable filling of the order container 3.

The trays 5 of the vertical conveyor 4 are basic modules of identical design, and the number of basic modules is determined by the vertical conveying height or the height difference to be bridged over between the central belts 1, 2. The basic modules may be put together vertically.

The central belt automatic unit may also have, above the upper central belt 1, at least one other upper central belt, which is connected at its front longitudinal end via another vertical conveyor of the above-mentioned type to the vertically directed vertical conveyor 4 or to the upper central belt 2.

For example, a composite arrangement of a central belt automatic unit comprising the embodiment variants according to FIGS. 1 and 3 may be provided.

Every individual central belt 1 or 2 may be used alone for smaller commissioning orders.

A commissioning operation, especially the filling of an order container 3, will be specifically described below in case of a central belt automatic unit according to FIG. 1.

The two central belts 1, 2 travel at equal velocity at the conveying velocity f.

Only the windows F1, F2 for a certain commissioning order will be considered as an example. Other windows, namely, the windows of other commissioning orders, are located in front of and behind the windows F1, F2 described. Additional containers, which are assigned to these other commissioning orders, are located in front of and behind the order container 3 described, which is positioned in the filling point P.

The vertical transfer or the vertical conveyor 4 needs a constant time k for cycling through the products or commissioning goods, which corresponds to the time offset of the windows F1, F2.

No product buffering is provided in the transfer site described for a simplified description. There certainly are transfer sites, at which buffering takes place.

During operation, an order container 3 passes by the log-on reader for the central belt automatic unit. The necessary length of the individual order windows F1, F2 is calculated at this point in time.

The windows F1, F2 are lined up next to the already allocated windows of the central belts 1, 2. Should the central belts not have any windows yet, the virtual window F1 is placed at the rear end H of the upper central belt 1. Window F2 for the lower central belt 2 is now located outside the lower central belt 2, quasi behind the deflection of the lower central belt 2.

Window F1 now moves forward on the upper central belt 1. After k seconds (k=displacement due to the transfer), window F2 for the lower part comes into the area of the lower central belt 2.

The ejectors on the sides of the central belt 1 or 2 eject the needed products into the central belt windows F1 and F2 passing by.

If window F1 has moved completely past the upper central belt 1 and all corresponding products are consequently in the vertical transfer or in the vertical conveyor 4, these are cycled farther downwardly. Window F2 at the lower central belt 2 continues to move forwards during this time.

At the time at which window F2 of the lower central belt 2 arrives at the transfer site, the order container 3 is already in the transfer site. Should this not be the case, both central belts 1, 2 and the vertical transfer or the vertical conveyor 4 are stopped until the order container 3 has arrived at the filling point P.

The products in window F2 of the lower central belt 2 fall into the order container 3 at the only filling point P.

The lowermost slide of tray 5 of the vertical conveyor 4 opens at the same time, and the products of the upper central belt 1 also fall into the order container 3.

The order container 3 leaves the filling point P after filling. The next order container moves in and takes over the products from the next central belt windows.

While specific embodiments of the invention have been shown and described in detail to illustrate the application of the principles of the invention, it will be understood that the invention may be embodied otherwise without departing from such principles.

The invention claimed is:

1. A process for filling an order container, the process comprising the steps of:
   providing an order container;
   providing at least two central belts, said two central belts comprising an upper central belt and a lower central belt;
   providing a vertical conveyor comprising a plurality of trays arranged in a vertical direction, said vertical conveyor being arranged between said two central belts, each of said trays comprising a first vertical guide rail, a second vertical guide rail, a first displaceable adjustable tilting wall, a second displaceable adjustable tilting wall, a first stationary side wall and a second stationary side wall, said first stationary side wall being located opposite said second stationary side wall, said first stationary side wall being located at a spaced location from said second stationary side wall, said first stationary side wall having a first lower horizontal guide rail, said second stationary side wall having a second lower horizontal guide rail, said first displaceable adjustable tilting wall and said second displaceable adjustable tilting wall being located between said first stationary side wall and said second stationary side wall, said first vertical guide rail being arranged adjacent to a lateral area of said first displaceable adjustable tilting wall, said second vertical guide rail being arranged adjacent to a lateral area of said second displaceable adjustable tilting wall, said first displaceable adjustable tilting wall being located opposite said second displaceable adjustable tilting wall, said first displaceable adjustable tilting wall being movable along said first lower horizontal guide rail, said second lower horizontal guide rail and said first vertical guide rail such that said first displaceable adjustable tilting wall moves from a closed position to an open position, said second displaceable adjustable tilting wall being movable along said first lower horizontal guide, said second lower horizontal guide rail and said second vertical guide rail from said closed position to said open position, wherein said first displaceable adjustable tilting wall and said second adjustable tilting wall are adjustable in height, said first displaceable adjustable tilting wall engaging said second displaceable adjustable tilting wall in said closed position;

arranging said central belts vertically one on top of another;

providing goods on said upper central belt;

transferring said goods on said upper central belt by opening and closing said trays such that said goods are transferred through each of said trays in a downward vertical direction; and filling said order container with said transferred goods for a commissioning order.

2. A process in accordance with claim 1, wherein said upper and lower central belts fill said order container with commissioning goods at said single filling point simultaneously or in a direct sequence, said vertical conveyor being in a fixed position, said vertical conveyor being perpendicular to said upper central belt and said lower central belt, said vertical conveyor extending between said upper central belt and said lower central belt, each of said trays being arranged above another one of said trays to form a stacked arrangement of trays.

3. A process in accordance with claim 1, wherein commissioning goods are ejected from said front longitudinal end of said upper central belt into the upper inlet of said vertical conveyor, conveyed downwards in the vertical conveyor, and ejected at the lower outlet of said vertical conveyor onto said lower central belt or into said order container.

4. A process in accordance with claim 1, wherein the downward conveying of the commissioning goods by said vertical conveyor takes place with the utilization of the force of gravity of said commissioning goods by cycled opening and closing of said trays.

5. A process in accordance with claim 1, wherein the commissioning goods being conveyed in said vertical conveyor are released or ejected onto said lower central belt in the area of a rear longitudinal end of said lower central belt prior to filling said order container.

6. A process in accordance with claim 1, wherein the commissioning goods being conveyed in said vertical conveyor are released or ejected along a middle section of said lower central belt prior to filling said order container.

7. A process in accordance with claim 1, wherein large-sized and/or heavy and/or frequently commissioned commissioning goods are commissioned on said lower central belt and small-sized and/or lightweight and/or rarely commissioned commissioning goods are commissioned on said upper central belt.

8. A process in accordance with claim 2, further comprising:
    arranging goods on a portion of one of said central belts, said one of said central belts having an end adjacent to a top portion of said vertical conveyor, wherein a distance between said portion of said one of said central belts and said end of said one of said central belts defines a first virtual window; and
    arranging goods on a portion of another one of said central belts, said another one of said central belts having an end adjacent to a bottom portion of said vertical conveyor, wherein a distance between said portion of said another one of said central belts and said end of said another one of said central belts defines a second virtual window, said first virtual window and said second virtual window being determined based on a transit time of the commissioning goods through said vertical conveyor, said first virtual window being offset in time, wherein said distance between said portion of said one of said central belts and said end of said one of said central belts is less than said distance between said portion of said another one of said central belts and said end of said another one of said central belts.

9. A process in accordance with claim 1, wherein said vertical conveyor is operated with a constant transit time.

10. A process in accordance with claim 1, wherein said upper and lower central belts are operated at equal conveying velocity.

11. A central belt automatic unit for filling an order container, the automatic unit comprising:
    two central belts comprising an upper central belt and a lower central belt, said two central belts being arranged vertically one on top of another and having a single filling point at a front longitudinal end of said lower central belt; and a vertical conveyor with stationary trays, which can be opened downwardly, and which
said vertical conveyor feeds commissioning goods from said upper central belt downwardly in a vertical direction directly to said filling point or transfers said commissioning goods from said upper central belt downwardly in said vertical direction to said lower central belt by cycled opening and closing of said trays, said vertical conveyor being connected at said front longitudinal end of said upper central belt, each of said trays comprising a first vertical guide rail, a second vertical guide rail, a first displaceable adjustable tilting wall, a second displaceable adjustable tilting wall, a first stationary side wall and a second stationary side wall, said first stationary side wall being located opposite said second stationary side wall, said first stationary side wall being located at a spaced location from said second stationary side wall, said first stationary side wall having a first lower horizontal guide rail, said second stationary side wall having a second lower horizontal guide rail, said first displaceable adjustable tilting wall and said second displaceable adjustable tilting wall being located between said first stationary side wall and said second stationary side wall, said first vertical guide rail being arranged adjacent to a lateral area of said first displaceable adjustable tilting wall, said second vertical guide rail being arranged adjacent to a lateral area of said second displaceable adjustable tilting wall, said first displaceable adjustable tilting wall being located opposite said second displaceable adjustable tilting wall, said first displaceable adjustable tilting wall being movable along said first lower horizontal guide rail, said second lower horizontal guide rail and said first vertical guide rail such that said first displaceable adjustable tilting wall moves from a closed position to an open position, said second displaceable adjustable tilting wall being movable along said first lower horizontal guide, said second lower horizontal guide rail and said second vertical guide rail from said closed position to said open position, wherein said first displaceable adjustable tilting wall and said second adjustable tilting wall are adjustable in height, said first displaceable adjustable tilting wall engaging said second displaceable adjustable tilting wall in said closed position.

12. A central belt automatic unit in accordance with claim 11, wherein said central computer of said central belt automatic unit has a control means for initiating the loading/commissioning of the commissioning goods onto said central belts after reading of the log-on and for controlling said central belts and said vertical conveyor as well as the readying and removal of said order containers.

13. A central belt automatic unit in accordance with claim 12, wherein said control means ensures a constant conveying velocity of said central belts.

14. A central belt automatic unit in accordance with claim 13, wherein said control means control the opening and closing of said trays such that a constant transit velocity of said vertical conveyor is provided.

15. A central belt automatic unit in accordance with claim 12, wherein said control means ensures the synchronous transfer of the commissioning goods or transfer of the commissioning goods directly consecutively in time from said central belts onto said order container.

16. A central belt automatic unit in accordance with claim 12, wherein said control means controls the opening and closing of said trays such that a buffer between goods is provided in said vertical conveyor.

17. A central belt automatic unit in accordance with claim 11, further comprising:
an additional central belt; and
another vertical conveyor, said additional central belt comprising a front longitudinal end, said front longitudinal end of said additional central belt being connected to said vertically directed vertical conveyor via said another vertical conveyor or to said upper central belt, said additional central belt being provided above said upper central belt.

18. A central belt automatic unit in accordance with claim 11, wherein each individual said central belt is provided for small commissioning orders.

19. A central belt automatic unit in accordance with claim 11, wherein said trays of said vertical conveyor are basic modules comprising one of a plurality of walls and a plurality of wedge-shaped horizontal slides, said one of said plurality of walls and said plurality of wedge-shaped horizontal slides being mounted for movement such that said one of said plurality of movable walls and said plurality of wedge-shaped horizontal slides are movable between an open position and a closed position, the a number of basic modules being said trays is determined by a vertical conveying height or a height difference to be bridged over between said central belts.

20. A central belt automatic unit in accordance with claim 19, wherein the basic modules said trays are arranged vertically to form a vertical stack arrangement of trays, said vertical conveyor being arranged between said two central belts, said vertical conveyor being perpendicular to said two central belts.

21. A central belt automatic unit in accordance with claim 11, wherein a filling hopper is arranged upstream of said individual filling point of said order container.

* * * * *

UNITED STATES PATENT AND TRADEMARK OFFICE
CERTIFICATE OF CORRECTION

PATENT NO. : 7,882,933 B2
APPLICATION NO. : 12/278466
DATED : February 8, 2011
INVENTOR(S) : Karl Freudelsperger It is certified that error appears in the above-identified patent and that said Letters Patent is hereby corrected as shown below:

Title Page, Item (73)

Please change to:
(73) Assignee: Knapp Logistik Automation GmBh,
Hart bei Graz (AT)

Signed and Sealed this
Twelfth Day of April, 2011

David J. Kappos
*Director of the United States Patent and Trademark Office*